Patented Oct. 26, 1943

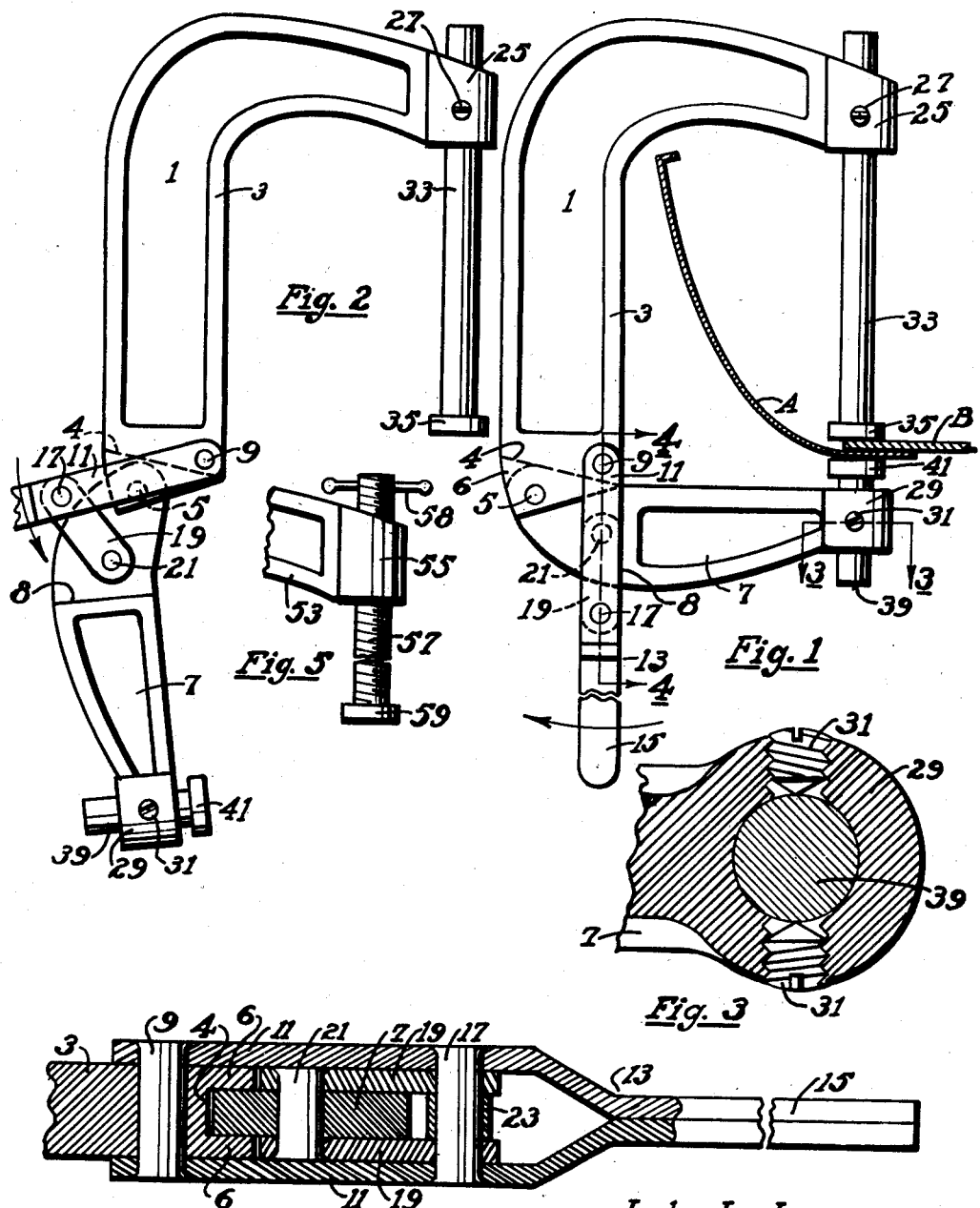

2,333,071

UNITED STATES PATENT OFFICE 2,333,071

CLAMP

Lyle L. Jannisse, Detroit, and John T. Spencer, Birmingham, Mich., assignors to Detroit Stamping Company, Detroit, Mich., a corporation of Michigan Application November 8, 1940, Serial No. 364,802

4 Claims. (Cl. 144—305)

This invention pertains to clamps, particularly to that type known as "C" clamps; and is intended for use in vehicle body and aircraft fuselage assembly as well as in quantity production set-ups as a jig or fixture.

The device of this invention may be used to hold such body or fuselage components in register and alignment during assembly operations or processing. It is equally useful as a holding fixture in machine tool set-ups in which sheets, castings, stampings, forgings, etc. are machined or finished. Its usefulness is not confined to the metal working arts, however, for it has particular advantages in the fields of wood-joinery, plastics assemblage, etc. as well.

The conventional "C" clamp, to which this invention bears a superficial resemblance, is, of course, a well known and widely used tool. However, its disadvantages in the field of quantity production are at once apparent. In order to place a "C" clamp on work having a considerable overhang such as is illustrated in Figure 1 of the accompanying drawing, the bolt of the "C" clamp must first be unscrewed approximately its full extent in order to place the work within the claimp. The bolt must then be screwed up to approximately its full extent to engage the work. These operations consume considerable time, and since such work must often be done in restricted quarters, it may be tedious and difficult of accomplishment. As the setting of a "C" clamp must be changed each time the clamp is applied, it is apparent that the degree of pressure exerted by the clamp is far from uniform from set-up to set-up; and, indeed, in many instances it is difficult to obtain sufficient pressure with such a clamp. Furthermore, the conventional "C" clamp is susceptible to damage or rusting of the bolt's screw threads by which the speed of its operation is further decreased and the necessary labor increased. In addition, the bolt may easily be bent out of axial alignment in which case the anvil at the end of the bolt tends to "circle" as the bolt is advanced rendering it difficult to obtain proper registration of the upper and lower anvils of the clamp.

A further disadvantage arises when, as is frequently the case in body or aircraft work, a conventional "C" clamp is used to hold components in place for welding operations. In such cases the welding electrode or torch must be brought in close proximity to the bolt of the clamp. Unless the greatest care is exercised the electrode or torch may come in contact with the clamp bolt; and the threads thereof, which are very vulnerable to such damage, will be fused. Once this damage occurs, the clamp may be removed from the work only by severing the bolt which occasions a further delay and the expense of replacement with a new bolt which becomes a considerable item of cost. All of these defects and disadvantages are obviated by the clamp of this invention which may be referred to as a toggle "C' clamp.

The advantages of the toggle "C" clamp are readily apparent. Its operation is practically instantaneous as the clamp may be opened to its fullest extent with one simple motion. When opened, it presents an aperture much larger than that of the conventional "C" clamp; and work which will not be accepted by a conventional clamp will be handled by a clamp of the same overall dimension made according to this invention. The toggle "C" clamp may be closed and the work engaged by a simple and speedy motion. The pressure exerted by a toggle "C" clamp is uniform each time it is used in a given set-up. By virtue of the linkage utilized, a tremendous holding pressure may be exerted by a comparatively small force applied to the clamp. This is important in assembly or production work where the objects to be held are subject to extreme vibration and the application of large forces incident to processing or finishing; and it is imperative that the work be held securely and without opportunity for even the slightest movement. As the anvils in a toggle "C" clamp do not rotate when advancing to engage the work, any axial misalignment in the rods which carry them does not affect their register once they are adjusted to the particular set-up. In welding operations when the electrode or torch comes in contact with the rod, a slight fusing does not destroy the utility of the clamp as in the case of one of conventional design. Only in cases of extreme damage will the rod be so deformed that it cannot be retracted; and in such cases—since the rod is plain and not threaded—it can be replaced at a minimum of expense. In fact, the construction of the new clamp is such that it is extremely sturdy and possesses no components which are susceptible of easy damage or derangement. It is widely and easily adjustable both as to the scope of work which it will accept and the pressure which it will exert. The design of the clamp is such that it is very compact that it may be used under conditions where a conventional clamp would not be suitable. Finally, it presents a novel use of a linkage by which a hinge action is obtained in a "C" clamp and a mechanical advantage is produced thereby for the speedy and powerful operation of such a clamp.

The invention is fully disclosed in the following specification and in the accompanying drawing which forms a part thereof; and in which Figure 1 is a side elevation of the toggle "C" clamp in closed position engaging the work.

Figure 2 is a side elevation of the same clamp in an open position.

Figure 3 is a cross section taken on the line 3—3.

Figure 4 is a cross section taken on the line 4—4.

Figure 5 is a fragmentary elevation of another form of the clamp showing a modification.

Like reference characters being used throughout to designate corresponding parts.

The clamp of the present invention is designated generally as 1. This includes an "L" shaped upper arm 3 which has, at its lower end, a channel 4 formed by the ears 6—6. Disposed within the channel 4 and hinged to the upper arm 3 by the rivet 5 which traverses the ears 6—6 is the lower arm 7. The latter has on each side thereof a shoulder as indicated at 8. Also pivoted to the upper arm 3 by the rivet 9 are the two main linkage levers 11, 11 which are disposed one on each side of the upper arm 3 and the lower arm 7. These linkage levers 11, 11 are joined as shown at 13 to form the operating handle 15. Pivotally attached to the main linkage levers 11, 11 by rivet 17 are the two toggle links 19, 19 which are also pivotally attached to the lower arm 7 by rivet 21. The toggle links 19, 19 are disposed one on each side of the lower arm 7 and are adapted to operate between the main linkage levers 11, 11 and such lower arm 7 as shown. A spacing bushing 23 is provided about rivet 17 to maintain linkage levers 11, 11 and toggle links 19, 19 in spaced operative position.

At the extremity of the upper arm 3, a boss 25 is provided which is adapted to receive slideably the rod 33 carrying the upper anvil 35. Similarly at the extremity of lower arm 7 there is the boss 29, rod 39 and lower anvil 41. Bosses 25 and 29 are each provided with two set screws indicated as 27 and 31, respectively, by which the rods 33 and 39 may be maintained in fixed relationship to such bosses 25 and 29. It follows that the positions of anvils 35 and 41 may be adjusted and secured at such point of adjustment.

Figure 1 shows the clamp in operative position in a body assembly application holding a desired alignment to body members designated as A and B. It is apparent that by suitable adjustment of the displacement of the anvils 35 and 41 with relation to the combined thickness of the engaging portions of A and B the pressure exerted on the work can be critically controlled.

Further reference to Figure 1 will show that the operation of handle 15 in the sense of the directory arrow will cause the lower arm 7 to pivot about the rivet 5 disengaging the anvil 41 from the work A, B. Such operation of handle 15 may be continued until the lower arm 7 reaches the position shown in Figure 2. The clamp is then fully opened and may readily be lifted from the work and easily replaced in a new set-up. It should be remembered that this operation is practically instantaneous and that the clamp when in the open position shown in Figure 2 may be removed from or placed on work of such overhand as is indicated by A without changing the setting of either of rods 33 or 39—an operation not possible with the conventional "C" clamp.

Similarly, when the clamp is in the open position shown in Figure 2, operation of the handle in the direction of the arrow shown thereon after the upper arm 3 and rod 33 have been disposed over such work as A, B will cause the lower arm 7 to pivot about rivet 5 and bring the lower anvil 41 against the lower surface of work A in predetermined register and with the requisite pressure. The mechanical advantage of the toggle link action is such that this closing is accomplished swiftly and with the exercise of a minimum of impressed force on the part of the operator.

As has been noted, these clamps must frequently be used in constricted quarters. It is for this reason that the disposition of the activating levers is important since they occupy a minimum of space and the width of the clamp is kept to the smallest practical dimension. Further, as the clamp is operated by a lever moving only in the plane of the body of the clamp, it may be utilized and operated satisfactorily in any set-up where space equal to the thickness of the clamp is available.

A modification of the clamp of this invention is shown in Figure 5. This view is only fragmentary as the remainder of the clamp constructed according to this modification conforms in all other respects to that shown in Figures 1 to 4. This modification adopts the bolt commonly found in the conventional "C" clamp and uses it with the toggle linkage heretofore described. In Figure 5, arm 53 corresponds to arm 3 of the other drawings. Boss 55 corresponds to boss 25 of the other drawings save that it is tapped to receive the threaded bolt 57 which carries the anvil 59. At the upper end of the bolt 57 is the cross-arm 58 which is available to assist in screwing the bolt 57 backwards or forwards to adjust the lower anvil 59. This construction uses the desirable features of the conventional "C" clamp—notably its ease of close adjustment—but adds the advantages inherent in the toggle linkage.

Finally, when the toggle links 19, 19 are aligned with the main linkage levers 11, 11 and are—as a consequence—abutting against the shoulders 8, 8, the clamp is effectively locked in the closed position and will not be loosened by the vibration incident to the processing of the work or by other forces incident to the processing of the work impressed on it.

While we have shown certain details of construction for carrying out our invention, it will be apparent that we are not limited to the detail structure herein shown and described, and various changes and modifications thereof may be made within the scope of the appended claims without departing from the spirit of our invention or sacrificing its advantages.

What we claim is:

1. In a "C" clamp, a body comprising a yolk and two clamping arms, one of said clamping arms being rigidly associated with said yoke, the second said clamping arm being pivotally attached to said yoke, an operating lever pivotally attached at one end to said yoke, and a link pivotally attached to said operating lever and to said second clamping arm, the point of attachment of said lever and said yoke being forwardly of the point of attachment of said arm and said yoke.

2. In a "C" clamp, a body comprising a yoke having clamping arms disposed at each end thereof, one of said clamping arms being rigidly associated with said yoke, the other of said clamping arms being pivotally attached to said yoke such point of pivotal attachment being at the back of said yoke, an operating lever pivotally attached at one end to said yoke such point of pivotal attachment being at the front of said yoke, a link, a rivet attaching said link to said operating arm, and a rivet attaching said link to said other clamping arm.

3. In a "C" clamp, a body comprising a yoke having clamping arms disposed at each end thereof, one of said clamping arms being rigidly associated with said yoke, a channel in the other end of said yoke, one end of the other of said clamping arms being disposed within said channel and pivotally attached therein to said yoke such point of pivotal attachment being at the back of said yoke, a bifurcated operating lever disposed with one arm thereof on either side of said yoke and other clamping arm, said operating lever being pivotally attached at the extremity of each of its bifurcations to said yoke such point of pivotal attachment being at the front of said yoke, links, a rivet attaching said links to the operating lever, and a rivet attaching said links to said other clamping arm.

4. In a "C" clamp comprising, a yoke having a fixed and a pivoted arm, toggle link means between said yoke and said pivoted arm including an operating lever and a link, the respective points at attachment of said pivoted arm and said toggle means with said yoke being offset so that in the open position the pivoted arm is substantially aligned with said yoke.

LYLE L. JANNISSE.
JOHN T. SPENCER.